United States Patent
Rosebrugh et al.

(10) Patent No.: US 6,340,190 B1
(45) Date of Patent: Jan. 22, 2002

(54) TAILGATE ATTACHMENT FOR EXTENDING THE CARGO SPACE OF A VEHICLE

(76) Inventors: Robert Rosebrugh, 128 Greenmeadow Ave., Newbury Park, CA (US) 91320; Ward Olson, 2812 Via Barri, Palos Verdes, CA (US) 92266

(*) Notice: Subject to any disclaimer, the term of this patent is extended or adjusted under 35 U.S.C. 154(b) by 0 days.

(21) Appl. No.: 09/514,783

(22) Filed: Feb. 28, 2000

Related U.S. Application Data

(60) Provisional application No. 60/132,457, filed on May 4, 1999.

(51) Int. Cl.[7] ................................................. B60P 1/00
(52) U.S. Cl. .................... 296/26.11; 296/50; 296/57.1
(58) Field of Search .................. 296/26.08, 26.11, 296/50, 57.1, 59; 16/366, 369, 368

(56) References Cited

U.S. PATENT DOCUMENTS

| | | | | |
|---|---|---|---|---|
| 1,009,108 A | * | 11/1911 | Soss | 16/366 |
| 2,000,541 A | * | 5/1935 | Van Note | 16/366 |
| 2,205,484 A | * | 6/1940 | Lindsay | 16/366 |
| 4,023,850 A | | 5/1977 | Tillery | 296/26 |
| 4,472,639 A | | 9/1984 | Bianchi | 296/26 |
| 4,763,944 A | * | 8/1988 | Fry et al. | 296/50 |
| 5,468,038 A | | 11/1995 | Sauri | 296/57.1 |
| 5,478,130 A | | 12/1995 | Matulin et al. | 296/57.1 |
| 5,542,591 A | * | 8/1996 | Moore et al. | 296/50 X |
| 5,658,033 A | | 8/1997 | Delaune | 296/26 |
| 5,700,047 A | | 12/1997 | Leitner et al. | 296/26 |
| 5,752,800 A | | 5/1998 | Brincks et al. | 414/537 |
| 5,755,480 A | | 5/1998 | Bryan | 296/26 |
| 5,765,892 A | | 6/1998 | Covington | 296/26 |
| 5,775,759 A | | 7/1998 | Cummins | 296/26 |
| 5,788,311 A | | 8/1998 | Tibbals | 296/62 |
| 5,806,907 A | | 9/1998 | Martinus et al. | 296/26.11 |
| 5,816,638 A | | 10/1998 | Pool, III | 296/26.11 |
| 5,820,188 A | | 10/1998 | Nash | 296/26 |
| 5,823,596 A | | 10/1998 | Kulesza | 296/26.08 |
| 5,823,597 A | | 10/1998 | Anderson | 296/26.08 |
| 5,826,932 A | | 10/1998 | DeSimone | 296/57.1 |
| 5,857,724 A | | 1/1999 | Jarman | 296/26 |
| 5,865,495 A | * | 2/1999 | Nguyen | 296/50 |
| 5,868,449 A | | 2/1999 | Hitchcock | 296/57.1 |
| 5,902,000 A | | 5/1999 | Wold | 296/26 |
| 5,918,925 A | | 7/1999 | Perrin | 296/26.11 |
| 5,924,753 A | | 7/1999 | DiBassie | 296/26.09 |
| 5,997,066 A | * | 12/1999 | Scott | 296/26.08 |
| 6,142,548 A | * | 11/2000 | Kuhn et al. | 296/57.1 X |

* cited by examiner

Primary Examiner—D. Glenn Dayoan
Assistant Examiner—Lori L. Coletta
(74) Attorney, Agent, or Firm—Eric Karich

(57) ABSTRACT

A tailgate attachment used in combination with a pivoting tailgate of a vehicle, includes a back panel and a pair of side panels having configurations adapted to form a rearward extension of the cargo space. Each of the side panels is pivotally coupled to the back panel. The back panel is attached to the tailgate with a pair of hinge members secured between an inside surface of the tailgate and the back panel. The pair of hinge members are each comprised of first and second securing elements and an intermediate rotating member. The intermediate rotating member rotatably secures the first and second securing elements to each other such that the first panel may be rotated around the pair of hinge members from a stowed position to a loading position, approximately 270 degrees away from the inside surface. The first securing element is preferably attached to the inside surface of the tailgate in proximity to a top edge of the tailgate. The pair of hinge members mount the tailgate attachment such that neither of the tailgate attachment nor the pair of hinge members extends above the top edge of the tailgate when the tailgate attachment is in the stowed position.

2 Claims, 3 Drawing Sheets

TAILGATE ATTACHMENT FOR EXTENDING THE CARGO SPACE OF A VEHICLE

CROSS-REFERENCE TO RELATED APPLICATIONS

This application for a utility patent claims the benefit of U.S. Provisional Application No. 60/132,457, filed May 4, 1999.

STATEMENT REGARDING FEDERALLY SPONSORED RESEARCH

Not Applicable

BACKGROUND OF THE INVENTION

1. Field of the Invention

This invention relates generally to a tailgate attachment for a vehicle, and more particularly to a tailgate attachment that extends the cargo space of the vehicle.

2. Description of Related Art

The following art defines the present state of this field:

Bianchi, U.S. Pat. No. 4,472,639, teaches a retractable extender structure for the tailgate of a pick-up truck or other vehicle which enables quick and convenient enlargement of the cargo space of the vehicle when necessary. A back panel and side panels are compactly carried against the inside surface of the closed tailgate when not in use while being pivotable into perpendicular relationship to the opened tailgate to increase cargo space.

Wold, U.S. Pat. No. 5,902,000, teaches a vehicle bed extender for attaching to a tailgate. The vehicle bed extender has a rear panel, the inner edge of which is hinged to the outer border of the tailgate. Side panels are provided, the bottom edges of which are hinged to the side border of the tailgate. The outer edges of the side panels are releasably hinged to the outer edge of the rear panel by a single hinge. The side panels have a diagonal hinge which folds inwardly when the rear panel is pushed toward the tailgate.

Covington, U.S. Pat. No. 5,765,892, teaches an extension apparatus for use with a vehicle having a cargo-bed area with opposing first and second side walls, and a tailgate movable between a vertical orientation and a horizontal orientation. The extension apparatus comprises a rear panel, which has opposing first and second ends, pivotally couplable to the tailgate to pivot the rear panel between a side-board configuration and a cargo-bed extension configuration. A first side panel is pivotally coupled to the rear panel adjacent the first end, and a second side panel is pivotally coupled to the rear panel adjacent the second end. The extension apparatus further includes a side panel receiver securable to a selected one of the first or second side walls of the cargo-bed area to receive a portion of the selected one of the first or second side panels therein. The unique configuration of the extension apparatus allows the extension apparatus to expand the cargo-bed area in a vertical direction when the rear panel is pivoted to the side-board configuration, or alternatively, to expand the cargo-bed area in a horizontal direction when the rear panel is pivoted to the cargo-bed extension configuration.

Pool, III, U.S. Pat. No. 5,816,638 teaches an attachment for elongating a pickup truck bed storage area which can also serve as a replacement tailgate for the truck's factory tailgate or a tailgate for the extended area and further a ramp, or stairway for loading the pickup truck. The device is easily attached to the pickup truck bed with the truck's existing tailgate lowered and encloses an area of the bed over the tailgate. The rear end of the device serves as a tailgate and a ramp or a stairway, which can be unlatched and unfolded extending for easy loading of the truck storage area.

Nash, U.S. Pat. No. 5,820,188, teaches a truck bed extender having a pair of generally parallel, spaced apart side walls which are joined to a back wall, and having an open top and an open bottom. A pair of forward pointing plates or tabs are coupled to the side walls, with the forward pointing plates generally structured and configured to slidably engage slots defined by the strike plates and truck bed walls of a pickup truck. A pair of downward pointing plates or tabs, each including an opening for a latch bolt, are also coupled to the side walls, with the downward pointing plates structured and configured to slidably engage the slots defined by the latch plates and sides of the tailgate of a pickup truck.

Kulesza, U.S. Pat. No. 5,823,596, teaches a truck tailgate fence mechanism which is attached to both the truck and the tailgate utilizing the existing latch and striker system of the truck tailgate. The mechanism utilizes a wall portion which is positioned on the extended tailgate in an upright orientation. A first fastener removably holds the wall portion to the tailgate and includes a first member which is fastened to the striker of the latch and striker system of the tailgate. A second fastener connects to the wall portion and removably fastens to the latch of the latch and striker system of the tailgate and truck bed partition.

DiBassie, U.S. Pat. No. 5,924,753 teaches a pickup truck bed extender consisting of two extendable side braces and an extender tailgate. The side braces are fabricated from two separate telescoping pieces adjustable for length so as to universally fit a variety of pickup trucks whether compact or full size. Each side brace bolts to the inner side of the pickup bed at a corner post. Each corner post features a square peg on the top and bottom that mates to square slots on the braces, and a latch pin secures side braces together by thrusting the pin downward through the holes in the adjoined braces and posts. The extender tailgate connects the two braces and may be adjustable in width in the same manner as the side units. A pair of side mounted support cables with quick release pins are used to prevent the extender tailgate from going past the horizontal position when opening. An extender flap could pivot from the extender tailgate, but would pivot in the forward direction to provide a floor surface when the existing tailgate is not long enough. The extender flap would have a rubber backing to prevent scratching to the existing surface of the existing tailgate.

Hitchcock, U.S. Pat. No. 5,868,449, teaches an auxiliary tailboard assembly for attachment to a drop-down tailgate that allows a user to bring the tailboard into vertical position, confining a load to the tailgate, after the goods have been loaded on the tailgate. The tailboard assembly includes a case for attachment to an inside face of the tailgate and a panel which can be extended and retracted in the case. A slot is provided into which the panel is seated when the panel is extended and rotated into vertical position and a stop for preventing removal of the panel from either the case or slot.

Jarman, U.S. Pat. No. 5,857,724, teaches an apparatus for extending a vehicle cargo area. The apparatus includes a main panel having a first end adapted for pivotally attaching to a tailgate, the main panel including non-planar sections formed therein; and a pair of side panels pivotally attached to opposite sides of the main panel, the side panels including non-planar sections formed therein, wherein the apparatus is positionable in a stowed position having the side panels folded into abutment with the main panel such that the non-planar sections of the side panels nest with the non-planar sections of the main panel. Also provided is an apparatus for extending the vehicle cargo area of a vehicle is provided for a vehicle having a side-swing style tailgate having a first end and a second end, the first end pivotally mounted to a vehicle body, the apparatus including a main panel having a first end and a second end, the first end pivotally mountable to the second end of the side-swing tailgate, the main panel having an operative position at about a right angle with the side-swing tailgate and a closed position abutting the side-swing tailgate; a side panel having a first end pivotally mounted to the second end of the main panel, the side panel having an operative position at about a right angle from the main panel, and a closed position abutting the main panel; the side panel having a second end attachable to the vehicle; and a floor panel disposed within the area defined by the side-swing tailgate, the side panel, the main panel and the vehicle when the apparatus is in the operative position.

Tibbals, U.S. Pat. No. 5,788,311, teaches an apparatus adapted to be attached to an existing tailgate of a vehicle or to a custom tailgate recessed to accept the device comprises a housing assembly adapted to be mounted on the vehicle tailgate, a chassis assembly slidingly engaged with the housing assembly, and a step assembly rotatably connected to the chassis assembly whereby the chassis assembly can be moved through the housing assembly and rotated so that the step assembly can be rotated out of the chassis assembly.

Bryan, U.S. Pat. No. 5,755,480, teaches a truck bed extension for pickup trucks, which extension is designed to increase the effective loading capacity of a pickup truck bed and requires no fasteners for mounting. The truck bed extension is characterized by a pair of quick-release cleats and brackets to facilitate rapidly loading and unloading the truck bed extension on the truck tailgate at the rear end of the bed of a pickup truck. In a preferred embodiment the truck bed extension includes a frame having parallel side frame members, each fitted with a cleat for removably engaging corresponding conventional bed brackets provided in the bed of the pickup truck. A pair of tailgate brackets are also welded or otherwise attached to the side frame members, respectively, for engaging the conventional latching pin mechanism attached to the ends of the downwardly-extended, horizontal tailgate of the pickup truck. Inside and outside frame stringers extend between the side frame members, an extension tailgate is hingedly attached to the outside stringer and releasably closes the rear end of the truck bed extension and an optional cover partially or completely closes the truck bed extension.

Leitner et al., U.S. Pat. No. 5,700,047 teaches an improved truck bed extender particularly adapted for ease of installation and removal. When not being used to extend the truck bed, the extender is advantageously adapted to quickly and easily create a secondary storage area. In one embodiment, the extender includes a first side wall, a second side wall, a connecting wall, a first mount and a second mount. The connecting wall extends between the first side wall and the second side wall, and cooperates with the first side wall and second side wall to form a generally U-shape frame. The first mount is secured to the first side wall and includes a first interlocking member. The second mount is secured to the second side wall and comprises a second interlocking member. The first interlocking member and the first mounting station on the vehicle and the second interlocking member and the second mounting station on the vehicle cooperate to secure the truck bed extender to the vehicle so that the extender is rotatable about an axis between a first and a second position. In the first position, the connecting wall is in an upright position over the tailgate beyond the rear end of the bed. In the second position, the connecting wall is in an upright position spaced forward from the rear end of the bed and the tailgate.

Delaune, U.S. Pat. No. 5,658,033, teaches an apparatus for extending a pickup truck bed includes a removable frame that can be connected to the pickup truck bumper or its hitch receiver. The frame includes a longitudinal beam that extends away from the truck bed during use, forming a connection with the receiver. A transverse beam is structurally attached to the distal end of the longitudinal beam and extends about the width of the pickup truck bed. Left and right side wall extension members are mounted respectively on opposite sides of the transverse beams, each side wall extension member being rectangular and having front and rear vertical edges and a lower edge that conforms to the plane of the bed. The frame provides an open area that allows the pickup truck tailgate to be lowered to define an extension of the load carrying surface of the bed. An auxiliary tailgate is pivotally attached to the transverse beam and is movable between open and closed positions. In the closed position, the auxiliary tailgate and the left and right side wall extension members form an enclosure about the lowered tailgate and thus an overall enclosure about the rear end portion of any load being carried.

The prior art teaches truck bed extending devices. However, the prior art does not teach a tailgate attachment with a pair of hinge members having the structure and properties described below. Specifically, the pair of hinge members are mounted onto the inside surface of the tailgate such that the tailgate attachment and the pair of hinge members do not extend above the top edge of the tailgate. Furthermore, the pair of hinge members can rotate 270 degrees from a stowed position, through an extended position, to a loading position in which the tailgate attachment hangs over the top edge of the tailgate so as to not obstruct loading the vehicle. The prior art also does not teach mounting the tailgate attachment entirely within the tailgate when the tailgate attachment is not in use. The present invention fulfills these needs and provides further related advantages as described in the following summary.

SUMMARY OF THE INVENTION

The present invention teaches certain benefits in construction and use which give rise to the objectives described below.

The present invention provides a tailgate attachment for a vehicle having a cargo space defined by a bed, upright sidewalls and a pivoting tailgate. The tailgate has an inside surface which faces the cargo space when the tailgate is at a closed upright position and which extends substantially horizontally to the rear of the bed when the tailgate is at an open position. The tailgate further has a top edge which is uppermost when the tailgate is at the closed upright position. The tailgate attachment includes a back panel and a pair of side panels having configurations adapted to form a rearward extension of the cargo space. Each of the side panels is pivotally coupled to the back panel. The back panel is attached to the tailgate with a hinge means for hingably attaching the back panel to the tailgate. The hinge means enables pivoting of the back panel through a range of positions including a stowed position in which the panels are parallel to the tailgate surface, an extended position at which the panels are positioned substantially perpendicular to the tailgate surface when the tailgate is at the open position, and a loading position in which the panels are rotated approximately 180 degrees from the extended position. The hinge means preferably couples the back panel to the inside surface of the tailgate in proximity to the top edge. The hinge means is structured such that neither of the tailgate attachment not the hinge means extends above the top edge of the tailgate when the tailgate attachment is in the stowed position.

A primary objective of the present invention is to provide a tailgate attachment having advantages not taught by the prior art.

Another objective is to provide a hinge means such that the tailgate attachment and the pair of hinge members do not extend above the top edge of the tailgate, while simultaneously allowing the tailgate attachment to rotate 270 degrees from a stowed position, through an extended position, to a loading position in which the tailgate attachment hangs over the top edge of the tailgate so as to not obstruct loading the vehicle.

A further objective is to provide a tailgate that allows the tailgate attachment to be stored entirely within the tailgate when the tailgate attachment is in the stowed position.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
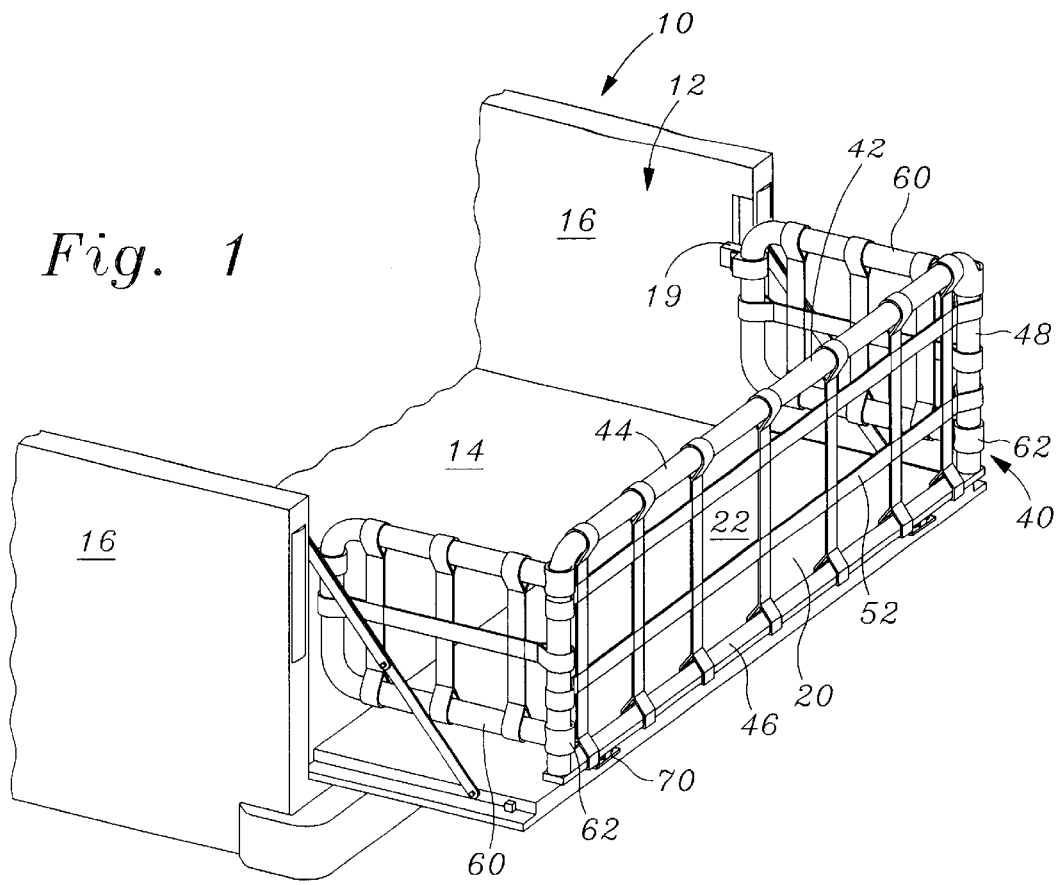
FIG. 1 is a perspective view of the preferred embodiment of the present invention, a tailgate attachment operably attached to a pivoting tailgate of a vehicle, the pivoting tailgate being positioned in an open position and the tailgate attachment being positioned in an extended position for extending the cargo space of the vehicle.
Figure 3:
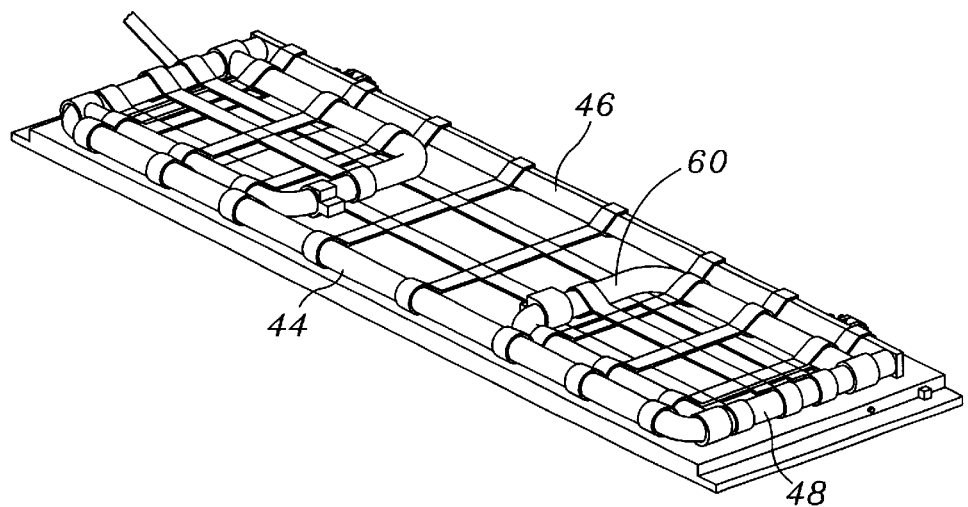
FIG. 3 is a perspective view thereof showing the side panels in the generally parallel relationship with the back panel, and showing the back panel folded into a stowed position.
Figure 4:
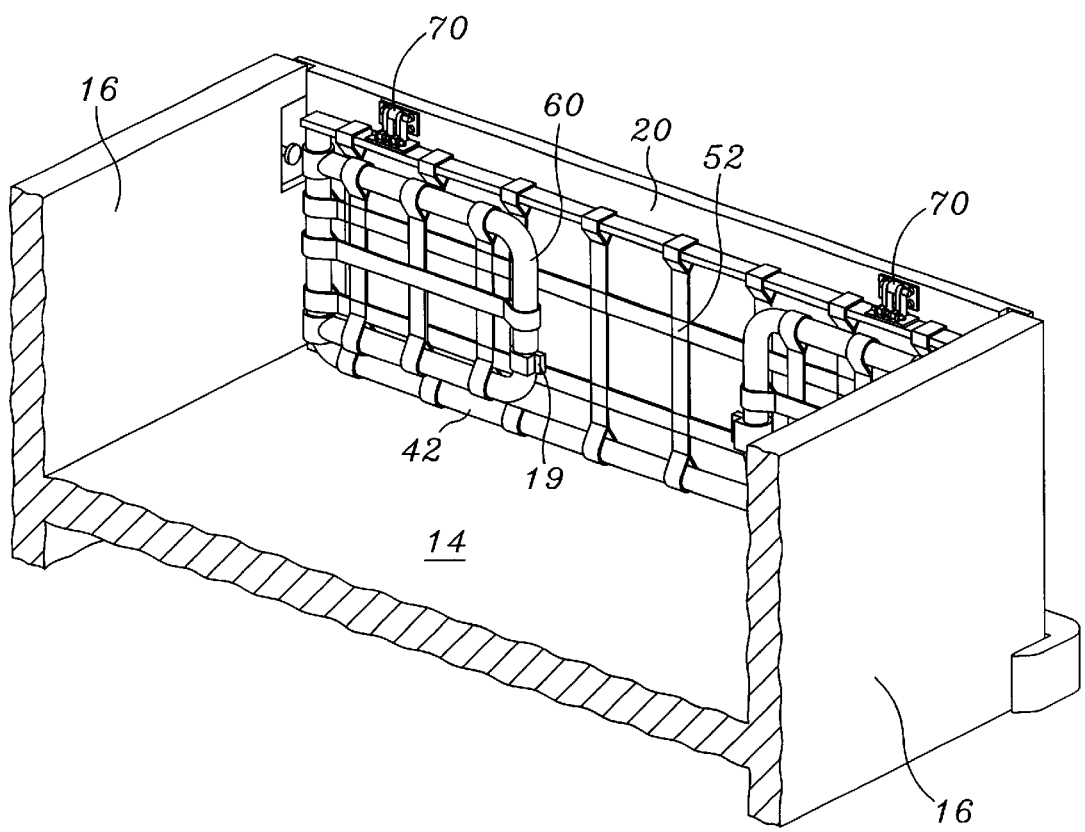
FIG. 4 is a perspective view thereof showing the pivoting tailgate in a closed upright position.
Figure 5:
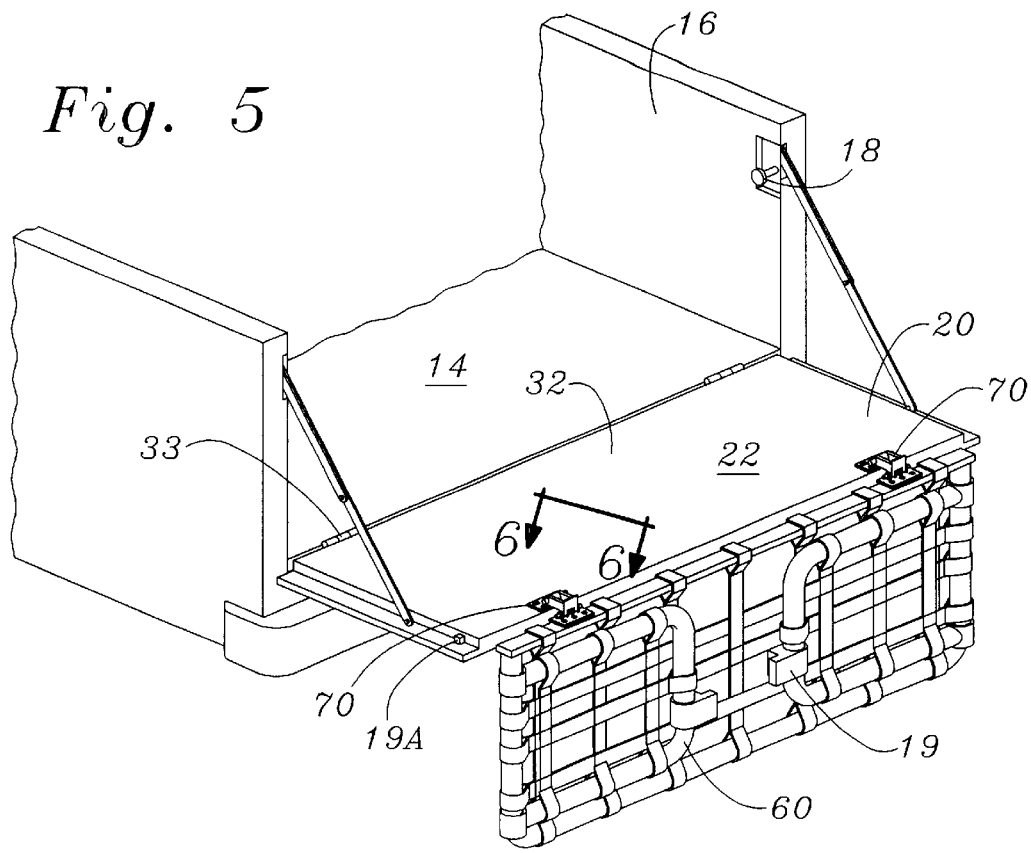
FIG. 5 is a perspective view thereof showing the pivoting tailgate in the open position and the back panel of the tailgate attachment in a loading position.

The above described drawing figures illustrate the invention, a tailgate attachment 40 for a vehicle 10 having a cargo space 12 defined by a bed 14, upright sidewalls 16 and a pivoting tailgate 20. The tailgate attachment 40 is attached to the tailgate 20 such that when the tailgate 20 is in an open position, as shown in FIG. 1, the tailgate attachment 40 folds to an extended position wherein the tailgate attachment 40 cooperates with the tailgate 20 and the sidewalls 16 of the vehicle 10 to extend the cargo space 12 of the vehicle 10. When not in use, as shown in FIG. 3, the tailgate attachment 40 folds to a stowed position against the tailgate 20 so that the tailgate attachment 40 does not take up unnecessary space within the cargo space 12 of the vehicle 10. As shown in FIG. 5, the tailgate attachment 40 also folds to a loading position in which the tailgate attachment 40 is positioned beneath the plane of an inside surface 22 of the tailgate 20 and roughly perpendicular thereto, thereby facilitating the loading of items into the cargo space 12 of the vehicle 10.

As shown in FIGS. 1–5, the tailgate 20 includes an outside surface 24 opposite the inside surface 22. The inside surface 22 of the tailgate 20 faces the cargo space 12 when the tailgate 20 is at a closed upright position and which extends substantially horizontally to the rear of the bed 14 when the tailgate 20 is at an open position. The tailgate 20 further provides a top edge 30 and a bottom portion 32. The top edge 30 is uppermost when the tailgate 20 is at the closed upright position. It is important that the tailgate attachment 40 does not extend above the top edge 30 when the tailgate 20 is in the closed upright position because the top edge 30 provides a bearing surface for items being loaded into the cargo space 12 over the tailgate 20. The bottom portion 32 of the tailgate 20 is attached to the vehicle 10, preferably with a tailgate hinge 33. The tailgate 20 preferably further includes a pair of latch engagement members 19A that each engage a strike latch 18 of each of the pair of sidewalls 16 to lock the tailgate 20 in the closed upright position. The basic structure of the tailgate 20 is well known in the art and is therefore not discussed in further detail.

As shown in FIG. 1, the tailgate attachment 40 includes a back panel 42 and a pair of side panels 60 having configurations adapted to form a rearward extension of the cargo space 12. The basic structure of a tailgate attachment 40 is similar to Bianshi, U.S. Pat. No. 4,472,639, hereby incorporated by reference. The back panel 42 preferably includes a top member 44, a bottom member 46, and a pair of tubular side members 48 having a central open portion 50 formed therebetween. The top member 44 and the side members 48 are preferably constructed of a single piece of tubular aluminum that is welded at either end to the bottom member 46 to provide a strong and rugged extension of the cargo space 12 of the vehicle 10. In alternative embodiments, however, the back panel 42 can be constructed with other materials such as steel or other suitably strong material.

A flexible netting material 52 is preferably secured in the central open portion 50 to prevent articles in the cargo space 12 from falling out while also allowing air to flow through the back panel 42, thereby reducing the drag on the vehicle 10. It is preferred that the flexible netting material 52 be constructed of nylon straps or similar lightweight material. In an alternative embodiment, a heavy "diamond" screen, as shown in Pool, III, U.S. Pat. No. 5,816,638, may be utilized to prevent smaller objects from falling out of the cargo space 12.

Figure 2:
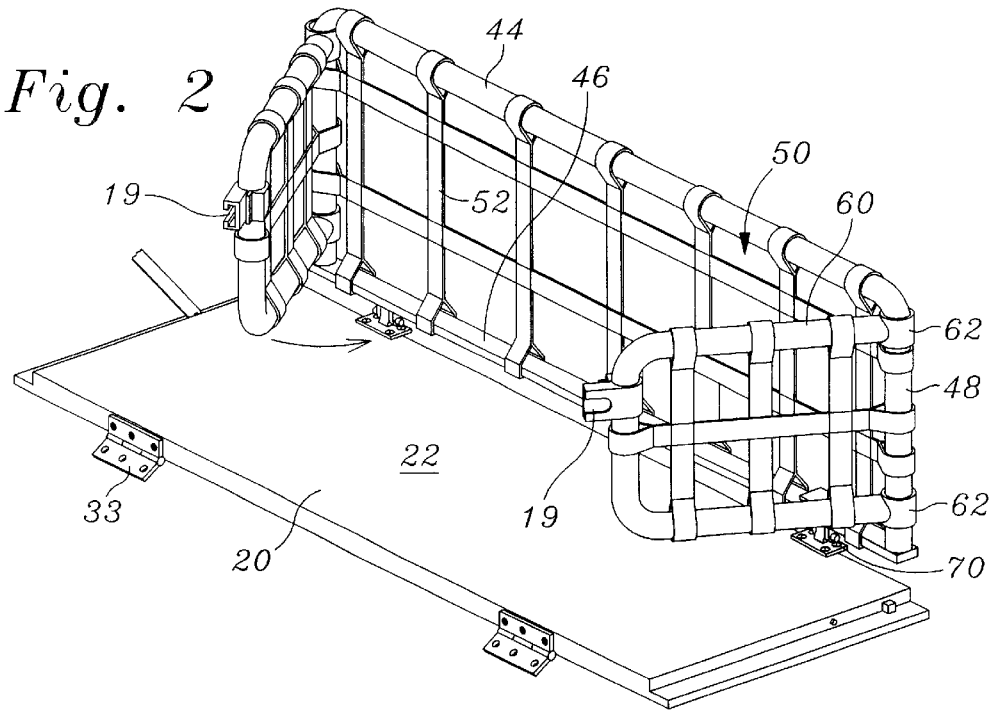
FIG. 2 is a perspective view thereof showing a pair of side panels being folded from the generally perpendicular relationship to a back panel, to a generally parallel relationship.

As shown in FIGS. 1–3, each of the side panels 60 is pivotally coupled to one of the pair of side members 48 of the back panel 42, the pivotal connection enabling the side panels 60 to be pivoted from a generally parallel relationship with the back panel 42 to a generally perpendicular relationship with the back panel 42. Each of the side panels 60 is preferably a generally U-shaped body that connects a pair of side panel sleeves 62. Each of the side panel sleeves 62 rotatably fit around one of the pair of side members 48 of the back panel 42. Each of the pair of side members 48 preferably has a tubular cross-section to facilitate the rotatable connection. The generally U-shaped body 60 is preferably sized and shaped to fit within the central open portion 50 of the back panel 42 when each of the side panels 60 are positioned in the generally parallel relationship with the back panel 42.

In the preferred embodiment, as shown in FIGS. 1 and 2, each of the side panels 60 further includes a locking means 19 for locking each of the side panels 60 to the vehicle 10 when the tailgate attachment 40 is in the extended position and each of the side panels 60 is in the generally perpendicular relationship. The locking means 19 is preferably an engagement member that is similar to the latch engagement member 19A, thereby allowing each of the side panels 60 to be locked in the extended position using the existing strike latch 18 of the vehicle 10, rather than requiring a new locking mechanism to be installed on the vehicle 10. The specific structure of the engagement member 19 will vary depending upon the year and make of the vehicle 10, the engagement member 19 being designed to cooperate with the strike latch 18 already installed on the vehicle 10 to removably lock the tailgate attachment 40 to the vehicle 10.

The tailgate attachment 40 is attached to the tailgate 20 with a hinge means 70 for hingably attaching the back panel 42 to the tailgate 20. The hinge means 70 enables pivoting of the back panel 42 through a range of positions including a stowed position in which the back and side panels 42 and 60 are parallel to the inside surface 22, an extended position at which the panels 42 and 60 are positioned substantially perpendicular to the inside surface 22 when the tailgate 20 is at the open position, and a loading position in which the panels 42 and 60 are rotated approximately 180 degrees from the extended position. The hinge means 70 preferably couples the back panel 42 to the inside surface 22 of the tailgate 20 in proximity to the top edge 30. The hinge means 70 is structured such that neither of the tailgate attachment 40 not the hinge means 70 extends above the top edge 30 of the tailgate 20 when the tailgate attachment 40 is in the stowed position.

Figure 6:
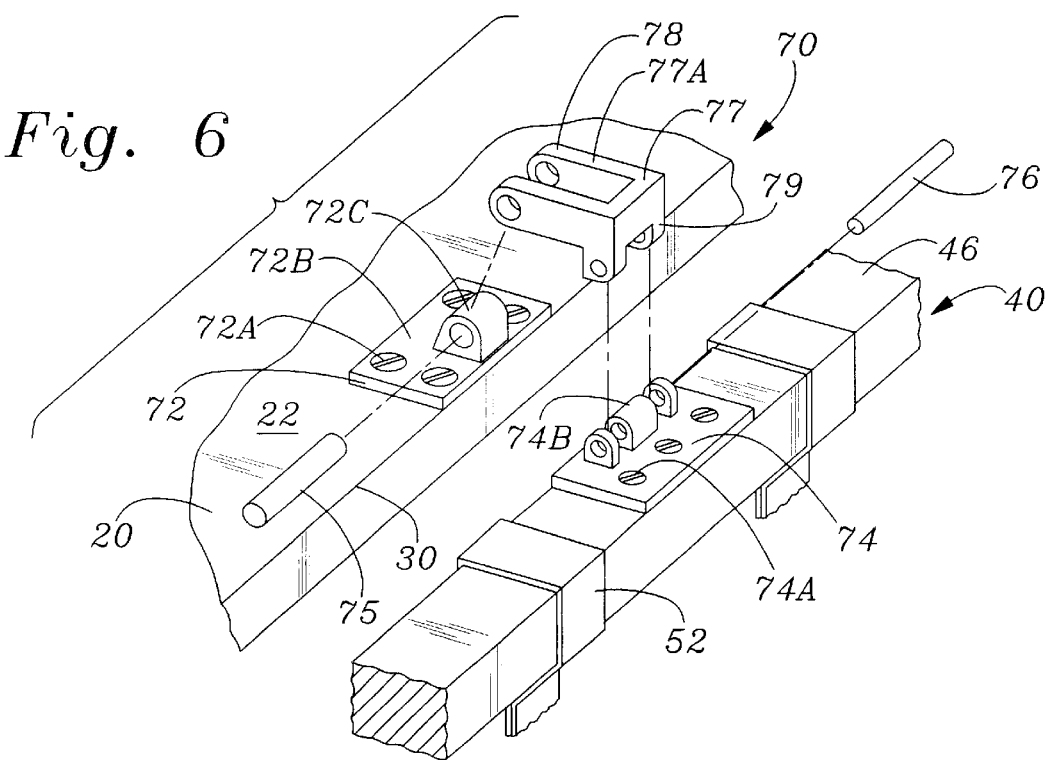
FIG. 6 is a sectional view thereof taken along line 6—6 in FIG. 5.

As shown in FIG. 6, the hinge means 70 is provided by a pair of hinge members secured between the inside surface 22 of the tailgate 20 and the back panel 42. The pair of hinge members 70 includes first and second securing elements 72 and 74 and an intermediate rotating member 77. The first securing element 72 is attached to the inside surface 22 of the tailgate 20 with a set of first screws 72A. The second securing element 74 is attached to the back panel 42 with a set of second screws 74A. Although screws are described in the present application, it is understood that this also includes other equivalent fasteners that are well known in the art.

The intermediate rotating member 77 includes an elongate body portion 77A that separates first and second pivot points 78 and 79. The intermediate rotating member 77 rotatably secures the first and second securing elements 72 and 74 to each other such that the back panel 42 may be rotated around the pair of hinge members 70 from the stowed position to the loading position, approximately 270 degrees away from the inside surface 22.

The first securing element 72 includes a first securing element upper surface 72B that is generally parallel to the inside surface 22 of the tailgate 20 when the first securing element 72 is attached to the tailgate 20. The first securing element 72 further includes a first securing element pivot point 72C that extends upwardly from the first securing element upper surface 72B. The first pivot point 78 is rotatably attached to the first securing element pivot point 72C with a first pivot pin 75. The intermediate rotating member 77 is thereby positioned to rotate approximately 180 degrees about the first pivot pin 75, the elongate body portion 77A of the intermediate rotating member 77 being constrained from further rotation by the first securing element upper surface 72B, as shown in FIGS. 5 and 6.

The second securing element 74 is rotatably attached to the intermediate rotating member 77 with a second pivot pin 76 through a second securing element pivot point 74B and the second pivot point 79 of the intermediate rotating member 77. The length of the elongate body portion 77A of the intermediate rotating member 77 is great enough to extend over the top edge 30 of the tailgate 20, thereby allowing the tailgate attachment 40 to hang vertically downward while being attached to the inside surface 22 of the tailgate 20 despite the fact that the combination of three hinge members 70 does not extend over the top edge 30 of the tailgate 20 when the tailgate attachment 40 is in the stowed position. The pair of hinge members 70 are preferably constructed of a rigid, rugged material such as aluminum or steel, with aluminum being preferred due to its light weight.

The invention includes a method for increasing the cargo space 12 in a vehicle 10 utilizing the tailgate attachment 40 described above. Each of the pair of side panels 60 is rotatably attached to one of the tubular side members 48, thereby enabling the side panels 60 to be pivoted from a generally parallel relationship with the back panel 42 to a generally perpendicular relationship with the back panel 42. The first securing element 72 of each of the pair of hinge members 70 is attached to the inside surface 22 of the tailgate 20. The second securing element 74 of each of the pair of hinge members 70 is attached to the bottom member 46. Finally, each of the first securing elements 72 is rotatably attached to one of the second securing elements 74, thereby allowing each of the pair of hinge members 70 to rotate the back panel 42 between a first position adjacent the inside surface 22 and a second position, substantially perpendicular to the outside surface 24 of the tailgate 20, approximately 270 degrees away from the inside surface 22.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tailgate attachment for a vehicle having a cargo space, the cargo space being defined by a bed, upright sidewalls and a tailgate, the tailgate having an inside surface which faces the cargo space when the tailgate is at a closed upright position and which extends substantially horizontally to the rear of the bed when the tailgate is at an open position, the tailgate further having a top edge which is uppermost when the tailgate is at the closed upright position, the tailgate attachment comprising:

a back panel and a pair of side panels having configurations adapted to form a rearward extension of the cargo space, each of the side panels being pivotally coupled to one of a pair of side members of the back panel enabling the side panels to be pivoted from a generally parallel relationship with the back panel to a generally perpendicular relationship with the back panel;

a first securing element adapted to be attached to the inside surface of the tailgate, the first securing element having a first securing element upper surface that is generally parallel to the inside surface of the tailgate when the first securing element is attached to the tailgate, the first securing element further including a first securing element pivot point that extends upwardly from the first securing element upper surface;

an intermediate rotating member that includes an elongate body portion that separates first and second pivot points of the intermediate rotating member;

a second securing element that is fixedly attached to the tailgate attachment, the second securing element having a second securing element pivot point;

a first pivot pin that rotatably engages the first securing element pivot point to the first pivot point such that the elongate body portion of the intermediate rotating member can rotate approximately 180 degrees about the first pivot pin, the rotation of the elongate body being constrained by the first securing element upper surface; and a second pivot pin that rotatably engages the second securing element pivot point to the second pivot point such that the back panel may be rotated approximately 270 degrees from the inside surface of the tailgate.

2. A method for increasing the cargo space in a vehicle, the method comprising the steps of:

a) providing a tailgate attachment comprising:
   a back panel having a top member, a bottom member, and a pair of tubular side members having a central open portion formed therebetween;
   a pair of side panels mounted on the pair of tubular side members, each of the side panels being pivotally coupled to one of a pair of side members of the back panel; and
   a pair of hinge members each having a first securing element, an intermediate rotating member, and a second securing element;

b) providing a vehicle having a cargo space defined by a bed, upright sidewalls and a tailgate pivotally attached to the vehicle at a bottom portion of the tailgate, the tailgate further having an inside surface which faces the cargo space when the tailgate is in a closed upright position and which extends substantially horizontally to the rear of the bed when the tailgate is in an open position, the tailgate further having a top edge which is uppermost when the tailgate is at the closed upright position;

c) rotatably attaching each of the pair of side panels to one of the tubular side members, thereby enabling the side panels to be pivoted from a generally parallel relationship with the back panel to a generally perpendicular relationship with the back panel;

d) attaching the first securing element of each of the pair of hinge members to the inside surface of the tailgate such that no portion of either of the first securing elements extends above the top edge of the tailgate;

e) attaching the second securing element of each of the pair of hinge members to the bottom member; and f) rotatably attaching each of the first securing elements to one of the second securing elements, thereby allowing each of the pair of hinge members to rotate the back panel between a first position adjacent the inside surface and a second position, substantially perpendicular to the outside surface of the tailgate, approximately 270 degrees away from the inside surface.

* * * * *